350-6.8 SR

XR 3,717,772

SEARCH ROOM

2

United States Patent [19]

Engman

SUBSTITUTE FOR MISSING XR

[11] 3,717,772

[45] Feb. 20, 1973

[54] LINEAR BIDIRECTIONAL SCANNING SYSTEM

[75] Inventor: George E. Engman, Framingham, Mass.

[73] Assignee: Midland Capital Corporation, New York, N.Y.

[22] Filed: Sept. 3, 1971

[21] Appl. No.: 177,638

[52] U.S. Cl. ....250/235, 250/83.3 H, 178/7.6

[51] Int. Cl. ....H01j 3/14

[58] Field of Search ....250/203, 236, 235, 83.3 H; 178/7.6, DIG. 8

[56] References Cited

UNITED STATES PATENTS

| | | | |
|---|---|---|---|
| 3,088,033 | 4/1963 | Kaufold | 250/203 R |
| 3,305,691 | 2/1967 | Hock | 250/235 |
| 3,020,414 | 2/1962 | McKnight et al. | 250/235 |
| 3,483,511 | 12/1969 | Rabinow | 250/235 X |
| 2,989,643 | 6/1961 | Scanlon | 250/230 |
| 3,518,002 | 6/1970 | Barringer et al. | 250/83.3 H X |

*Primary Examiner*—Walter Stolwein
*Attorney*—Joseph Weingarten et al.

[57] ABSTRACT

A constant scan rate bidirectional infrared scanning system. A low momentum oscillatory scanning mirror is servo controlled to provide bidirectional linear frame scanning which results in a doubling of display intensity and reduction of flicker awareness. The sensitivity of the scanning system to vibration is reduced and the scan rate made readily available without loss of linearity or the other advantages of bidirectional scanning.

14 Claims, 7 Drawing Figures

INVENTOR
GEORGE E. ENGMAN
BY
Weingarten, Maxham & Schurgin
ATTORNEYS

LINEAR BIDIRECTIONAL SCANNING SYSTEM

FIELD OF THE INVENTION

This invention relates to radiation scanning systems and in particular to a linear bidirectional scanning system having a servo controlled scan motion.

BACKGROUND OF THE INVENTION

Optical scanning systems, particularly those suited for the detection of low level infrared radiation incident over a field of view, are becoming of increasing significance for detecting the properties or existence of objects. As the usefulness of infrared scanning systems are increasingly recognized, the diverse applications to which they are put place greater demands upon the capabilities of the scanning system for the infrared detector. At the same time, simplicity and economy of design have become more important considerations in infrared scanners so that they may economically develop from a laboratory tool to an industrial one in these new applications.

SUMMARY OF THE INVENTION

In a preferred embodiment of the present invention, an optical scanning system is shown, particularly suited for infrared detection applications, and providing linear, bidirectional frame scanning of infrared radiation incident over a field of view. A low inertia frame scanning mirror is pivotally supported and caused to oscillate with a linear bidirectional rate in response to a triangle wave excitation and a motor servo system utilizing mirror position and rate feedback control. The servo system provides an electronically produced bounce effect that causes rapid and smooth reversals in mirror rotation and provides a linear, constant rate scan between reversals.

Operating in conjunction with a display system for two dimensional radiation imaging, the linear bidirectional scanning system eliminates the need for electronic processing to compensate for variation in scan speed within a single frame. Moreover, a more rapid display repetition rate is achieved to reduce perceptible display flicker. The scan rate may be widely varied without deterioration in the scan consistency resulting from different dynamic responses in the mechanical scanning system to a different scan rate. The servo control system, furthermore, provides sufficient linearity control to substantially reduce the vibration sensitivity of the scanning mechanism in such applications as radiation detection from a moving vehicle.

DESCRIPTION OF THE DRAWINGS

These and other features of the invention will be more fully understood by reference to the following detailed description of a preferred embodiment presented for purposes of illustration, and not by way of limitation, and to the accompanying drawings of which.

DETAILED DESCRIPTION OF THE PREFERRED EMBODIMENT

Figures 1, 2:
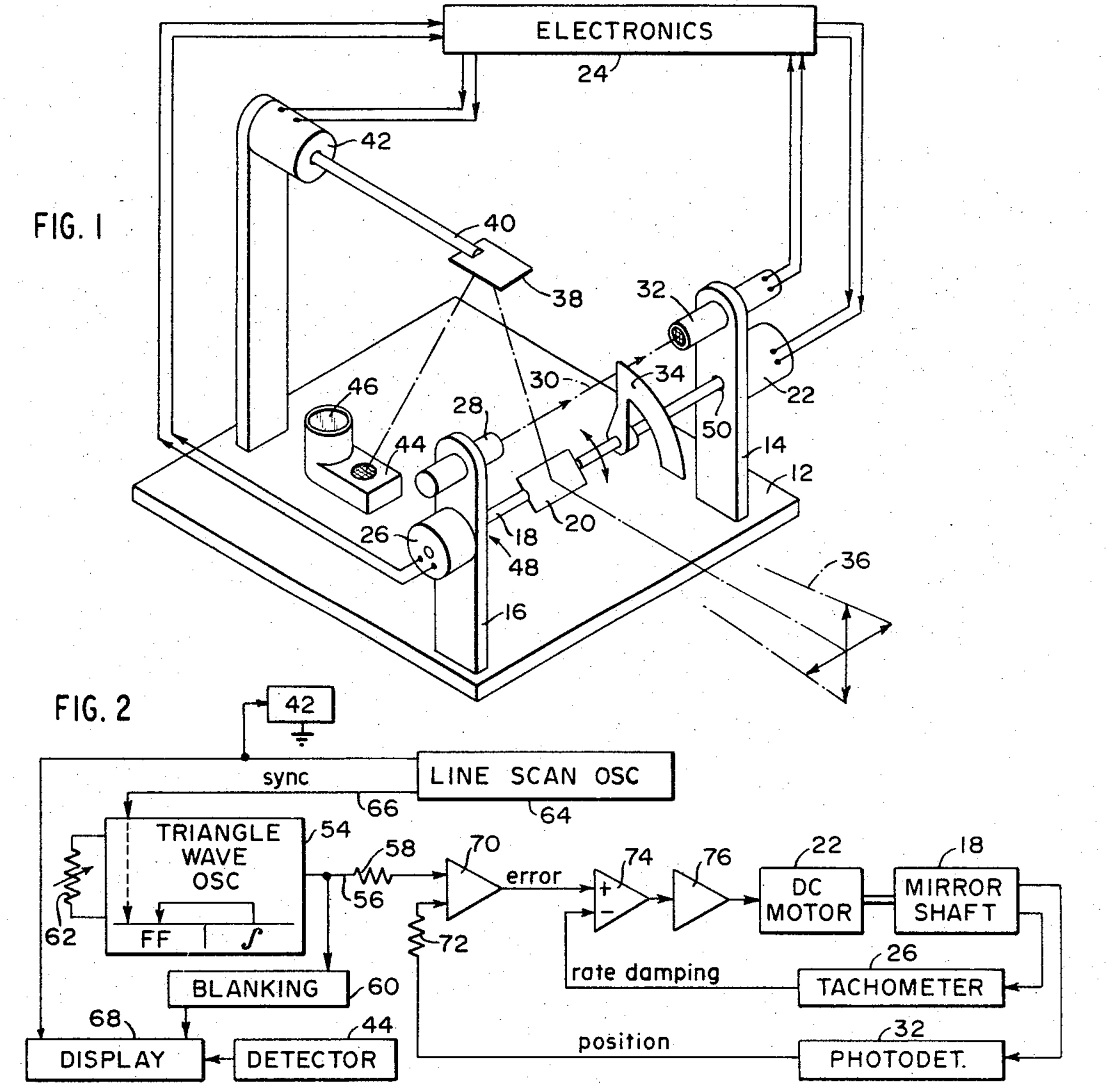
FIG. 1 is a pictorial view of a linear bidirectional scanning system mechanism.
FIG. 2 is a partial block and partial schematic diagram of electronics associated with the mechanism of FIG. 1 for accomplishing frame scanning and display functions.

In application for U.S. Pat. Ser. No. 4,856 of James Fred Stoddard filed Jan. 22, 1970, an infrared scanning mechanism is indicated for line and frame scanning of infrared radiation incident over a field of view. In that application a frame scanning mirror is induced to oscillate with a sinusoidal motion. When the resulting infrared sensitive detector signal is displayed on a cathode-ray-tube, the variation in mirror speed, and consequent variation in trace speed produces a corresponding variation of intensity in the cathode-ray-tube display which is not representative of a variation in radiation received by the detector. Electronic compensation is shown in that application to eliminate the variation in display intensity attributable to the sinusoidal mirror oscillation.

In the present case, an infrared scanning system is shown operating to provide a linear rather than sinusoidal scan and having features which provide an increased scan stability. The invention may best be understood by reference to FIG. 1 indicating in pictorial view the internal scanning mechanism of a linear, bidirectional scanner according to the invention.

Supported from a floor 12 of the scanning system, first and second arms 14 and 16 are provided to rotationally support a shaft 18 having a plane reflecting surface or mirror 20 mounted thereto with the axis of shaft 18 coplanar to the surface 20.

A DC torque motor 22 is mounted on the support 14 about the shaft 18 to provide bidirectional rotational torque to the shaft 18 in response to a DC signal and associated polarity applied to the motor 22 from electronics 24 shown in FIG. 2. A rate tachometer 26 is supported by the arm 16 about the shaft 18 and provides a DC output signal to the FIG. 2 electronics substantially proportionally to the rate of rotation of the shaft 18 and mirror 20.

Mounted to the arm 16 is a source of illumination 28 which directs a beam 30 of light substantially parallel to the axis of shaft 18 to a photodetector 32 mounted to the arm 14. ATtached to the shaft 18 and rotatable therewith is a vane 34 of low rotational inertia. It may be counterweighted or not as desired. The vane 34 is sickle shaped with the blade of the sickle provided to intercept and occlude the light beam 30 between the source 28 and photodetector 32 to varying degrees depending upon the relative angle of the shaft 18 and mirror 20. The blade portion of vane 34 provides complete occlusion or no occlusion of the beam 30 over a portion of the rotational angle for shaft 18 between stops (not shown) in order to provide automatic reset of the shaft 18 and mirror 20 to the operating position if displaced therefrom accidentally by jarring or vibration. The photodetector 32 provides an electrical signal to the electronics of FIG. 2 which signal varies in magnitude with the degree of occlusion of the light beam 30 by vane 34 and correspondingly with the angle of rotation of the shaft 18 and mirror 20. Different angles of rotation can be achieved by varying the width of the beam 30 or by using a spiraling outer edge of the vane to vary with angle the light incident on detector 32.

A field of view 36 which may include conventional optics as desired is indicated in FIG. 1, and infrared radiation within the field of view 36 is incident upon the mirror 20 at an angle determined by its point of rotation. Radiation reflected by the mirror 20 will be at an angle within a range of angles which will strike a line scanning mirror 38 supported by a shaft 40 and driven by a driver 42 at a rate significantly faster than the oscillation of the mirror 20 in order to provide line scanning of radiation within the field of view 36. The radiation incident on the line scanning mirror 38 is redirected by reflection toward an infrared detector system 44 mounted on support 12 and which includes appropriate focusing optics as well as an infrared sensitive detector, preferably of the cryogenically cooled type. A reservoir 46 of a cryogenic fluid, such as liquid helium, is provided to maintain an ultralow detector temperature.

To provide for relatively fast motional response in the mirror 20, the shaft 18, mirror 20 and vane 34 are designed with a minimum of rotational inertia. Pivots 48 and 50 for the shaft 18 are made to be of low friction. Alternatively, the suspension for the shaft 18 may be electromagnetic and provided by supporting coils within the motor 22 and tachometer 26.

To further improve the motional response of the mirror 20, a servo-control system is provided by the electronic system indicated in FIG. 2. In FIG. 2, a triangle wave oscillator 54 provides a triangle wave signal on a line 56 to a resistor 58 and a blanking circuit 60. The oscillator 54 has a control 62 adapted to provide variation in the period of the triangle wave. A higher frequency, line scan oscillator 64, operating at a nominal frequency of, for example, one hundred times that of the frequency of the oscillator 54, provides a synchronizing signal on a line 66 to the triangle wave oscillator 54. The synchronizing signal on line 66 is applied to the triangle wave oscillator 54 to cause each slope of the triangle wave oscillator 54 to commence coincidentally with the commencement of a line scan provided by the line scan oscillator 64. Such may be achieved by toggling a flip-flop within oscillator 54 coincident with a line scan initiation signal on line 66 after a complete frame scan. The triangle wave is produced by an output magnitude limited integrator and the magnitude limits, when reached, provide an enabling signal for the flip-flop to toggle. The number of scan lines in each cycle of the triangle wave from the oscillator 54 is varied by the control 62, while the line 66 signal insures coordination between the oscillators 54 and 64.

The oscillatory signal from the line scan oscillator 64 is fed to the driver 42 for the line scan mirror 38 and along with the output from the blanking circuit 60, is applied to orthogonal displacement controls of a display unit 68 including an imaging device such as a cathode-ray-tube. The display 68 also receives electrical signals from the detector 44 on a Z axis modulation input. In this manner, visual representations of detected radiation intensity are imaged by the display 68 in a series of brightness modulated parallel, spaced scan lines. The blanking circuit has high and low thresholds intermediate the triangle wave limits to blank imaging except when the triangle wave is between the thresholds so as to eliminate the first few and last few scan lines in a trace for each frame and prevent line cramping effects attributable to slope reversals in the triangle wave from the oscillator 54.

The triangle wave signal from the oscillator 54 through the resistor 58 is differentially applied to a high gain summing amplifier 70 along with a positional signal from the photocell 32 through a resistor 72. The summed output of the high gain summing amplifier 70 is applied to a noninverting input of an amplifier 74 while an inverting input thereof receives a rate signal from the tachometer 26. The output of the amplifier 74 is applied to a power amplifier 76 and thence to the DC motor 22 for supplying torque to the shaft 18. Angular displacement and rate of the shaft 18 respectively result in the production of positional and rate signals from the photocell 32 and tachometer 26.

Figure 3:
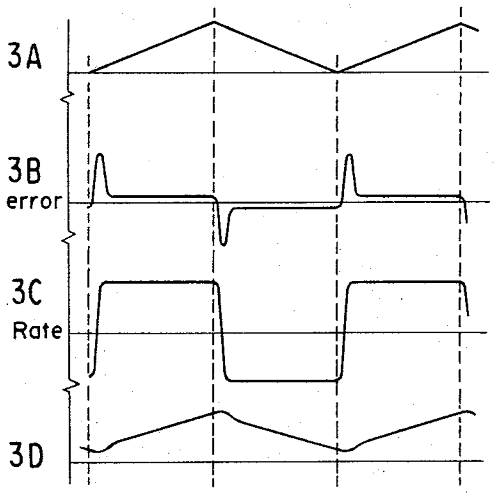
FIGS. 3A–3D are waveform diagrams useful in understanding the operation of the invention.

The presence of the rate signal from the tachometer 26, differenced in the amplifier 74, adds significant stability to the driving system for the shaft 18. Because of this stability, the gain of the amplifier 70 can be made very high to achieve a larger error signal at the output of the amplifier 70 in response to only small differences between mirror shaft position, indicated by the output of the photocell 32, and desired mirror shaft position, indicated by the magnitude of the triangle wave from the oscillator 54. The high gain of amplifier 70, provides for rapid reversals of the rotational momentum and direction of the shaft 18 at each slope reversal in the triangle wave from the oscillator 54. This can be best appreciated by referenced to FIGS. 3A and 3B showing respectively the output from the oscillator 54 and the error signal at the output of the amplifier 70. With each reversal in the slope of the triangle wave, FIG. 3A, the error signal, FIG. 3B, produces a high magnitude pulse attributable to continuing momentum in the shaft 18 despite the electrical reversal in the triangle wave signal from the oscillator 54. This high magnitude impulse is applied directly to the power amplifier 76 and motor 22 to reverse torque or effectively bounce the shaft 18 and almost instantly reverse its direction and rate of rotation.

During constant rate driving of the mirror shaft 18 between reversals, very little power is required by the DC motor to torque the shaft 18 except when vibration or other perturbations begin to disturb the shaft 18 from its proper position. As it happens the high gain in the amplifier 70 produces an immediately effective corrective signal to the DC motor 22 with appropriate damping by the rate signal, FIG. 3C, to prevent oscillations and instability resulting from the perturbation.

In the vane 34 of FIG. 1 the long peripheral or blade portion prevents the photodetector 32 from receiving radiation over a substantial arc of rotation of the shaft 18. The resulting positional signal, FIG. 3D, from the photodetector 32 causes the motor 22 to drive the shaft 18 until the beam 30 of illumination on the photodetector is occluded to a degree corresponding to the magnitude of the triangle wave and the shaft 18 is then within its angle of operation. Restoration from the other direction of displacement is achieved by an opposite effect. In this manner, the shaft 18 can be restored to its operating range if accidentally perturbed therefrom, without the necessity of closely spaced mechanical stops which might damage the system if struck hard by the shaft in response to a shock to the instrument.

Bidirectional scanning of the system induced by the triangle wave from the oscillator 54 provides twice the intensity on the display 68 and reduces perceptible flicker by doubling the frame scanning rate. These functions are accomplished directly and simply without the need for additional, peripheral processing and control electronics, and allow for a substantially fast, variable scanning rate while maintaining vibration immunity.

Figure 4:
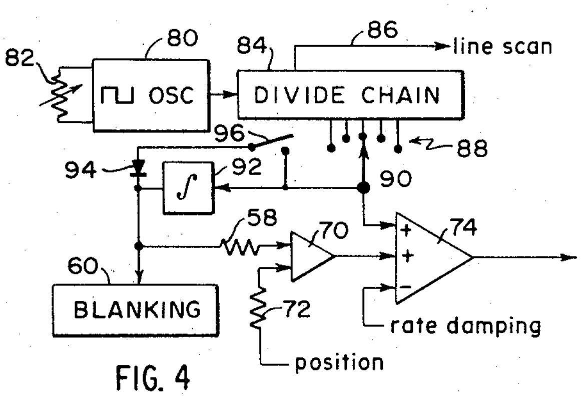
FIG. 4 shows a portion of the circuitry of FIG. 2 with modifications.

A modification to the system of FIG. 2 is indicated in FIG. 4 and provides greater stability in shifting speed and lower error to the frame scanning mirror 20 and other advantages in circuit components. The modifications indicated in FIG. 4 affect primarily the circuitry for generating the mirror drive excitation and include a square wave oscillator 80 having a frequency adjustment 82. The output of the oscillator 80 is fed into a frequency divide chain 84 having, for example, a plurality of flip-flop circuits cascaded to provide frequency division. A tap 86 is provided from the divide chain 84 at a relatively high frequency for use as the line scanning signal to control the line scanning mirror 38 through the driver 42 indicated in FIG. 1. A plurality of relatively lower frequency taps 88 provide selectively different square wave frequencies from the divide chain 84 for the lower frequency frame scanning excitation. The square wave signal is selected from the taps 88 by a switch 90 and applied to an integrator circuit 92 to provide a triangle wave excitation which is subsequently conducted to the blanking circuit 60 and through the resistor 58 to the amplifier 70. The square wave signal selected from the taps 88 is also applied to a noninverting input of the amplifier 74 to augment the stabilizing effect of the system by counter balancing the constant rate portions of the rate signal applied to an inverting input as indicated in FIG. 2. Rate variations can then be amplified to increase stability, variation insensitivity and the bounce return effect.

While the above-described preferred embodiment has been presented with reference to a triangle wave excitation source for the frame scanning, it is possible to use a sawtooth excitation for the frame scanning and maintain a high degree of stability in the rotation of the frame scanning mirror 20. An advantage of the sawtooth drive is compatibility with a television scan system. Sawtooth excitation can be readily achieved by substituting a sawtooth oscillator for the triangle wave oscillator 54 in FIG. 2 or by adding to the bidirectional integrator 92 an integrator of the type having an operational amplifier which integrates positive differences between the input signal and a ground reference but responds directly to negative differences between those two signals through a diode feedback 94 by closure of a switch 96.

Having above described preferred embodiments of the present invention, it will occur to those skilled in the art that modifications and alterations can be made in the disclosed structure without departing from the spirit and scope of the invention. It is accordingly intended to limit the scope of the invention only as indicated in the following claims.

What is claimed is:

1. A system for linear, bidirectional scanning of radiation within a field of view comprising:
   - means for receiving radiation from said field of view and for redirecting said received radiation in accordance with an angular orientation of said redirecting means;
   - means for supporting said redirecting means for rotation about an axis;
   - torquing means operative in response to a drive signal to torque said redirecting means about its axis of rotation in an angular direction depending upon one of two opposite characteristics of said drive signal, thereby to cause said redirecting means to scan through an angle of said field of view;
   - means for detecting the rotation of said redirecting means and for generating a rate signal representative of the rotational rate of said redirecting means;
   - means operative in response to rotation of said redirecting means for providing a positional signal representative of the relative angular position of said redirecting means about its axis of rotation; and
   - means for generating a scan signal having first and second oppositely and linearly varying characteristics which sequentially alternate;
   - said characteristics representing angular position of said redirecting means;
   - means for combining and amplifying said scan signal and said positional signal to provide an error signal representing the difference between the instantaneous position of said redirecting means the position thereof represented by the characteristics of said scan signal;
   - means for combining said error signal and said rate signal to produce said drive signal; and
   - means for applying said drive signal to said torquing means, thereby to cause bidirectional, linear rotation of said redirecting means in correspondence with said first and second characteristics of said scan signal.

2. The linear, bidirectional scanning system of claim 1 wherein said positional signal is produced by:
   - a photodetector operating in response to incident illumination; and
   - means for varyingly occluding the illumination incident on said photodetector in correspondence with the angular position of said redirecting means.

3. The linear, bidirectional scanning system of claim 2 wherein:
   - said means for varyingly occluding radiation incident on said photodetector includes a low inertia vane rotating with said redirecting means in the path of illumination incident on said photodetector; and
   - said vane is adapted to operate in association with said photodetector to produce a positional signal and resulting drive signal that restores said shaft to its operating range when perturbed therefrom.

4. The linear, bidirectional scanning system of claim 1 further including means for varying the rate of variation of said scan signal, thereby to vary the bidirectional rotational rate of said redirecting means.

5. The linear, bidirectional scanning system of claim 4 further including:
   - line scanning means for scanning radiation from said field of view through an angle orthogonal to the angle of scan of said redirecting means and operative in association therewith to scan a plurality of times for each scan of said redirecting means; and means for synchronizing the alternation of said first and second characteristics of said scan signal to the scanning of said line scanning means to commence generation of each of said characteristics with a scan of said line scanning means.

6. The linear, bidirectional scanning system of claim 5 further including:

a radiation detector for receiving radiation from said redirecting means and said line scanning means and operative in response thereto to provide an electrical signal representative of the magnitude of received radiation;

means for displaying radiation received by said detector in response to said detector signal and scanning of said redirecting means and line scanning means; and means for inhibiting display of said detected radiation during predetermined portions of the scan of redirecting means near the rotational limits thereof.

7. The linear, bidirectional scanning system of claim 1 wherein:

said torquing means is a DC motor;

said means for developing said damping signal is a rate tachometer; and said means for generating said scan signal is a triangle wave oscillator.

8. The linear, bidirectional scanning system of claim 7 wherein:

said triangle wave oscillator includes:

a square wave generator; and means for developing a signal which is the integral of the square wave signal from said square wave oscillator; and said combining means for producing said drive signal further includes means for differencing said square wave signal and said rate signal.

9. A system for linear bidirectional scanning of radiation within a field of view comprising:

means responsive to radiation from said field of view for redirecting said radiation in accordance with an angular orientation of said redirecting means;

means for supporting said redirecting means to permit variation in the angular orientation of said redirecting means;

means for generating a scan signal having first and second alternating portions of oppositely and linearly varying characteristics;

means for detecting rotation of said redirecting means to provide a rotation representing signal;

means for combining said scan signal and said rotation representing signal to provide a drive signal;

means for bidirectionally torquing said redirecting means in response to said drive signal to cause linear, constant rate variation in the angular orientation thereof in response to said first and second portions of said scan signal;

said torquing means thereby providing damped, rapid momentum reversal in the rate of variation of the angular orientation of said redirecting means in response to said drive signal.

10. The system for linear bidirectional scanning of radiation of claim 9 wherein said means for providing a rotation representing signal includes means for altering the characteristic of said rotation representing signal when said redirecting means exceeds predetermined rotational limits to provide in said drive signal a characteristic which causes said torquing means to return said redirecting means to the range of variation between said rotational limits when said redirecting means is displaced therefrom.

11. A system for linear, bidirectional scanning of radiation within a field of view comprising:

means responsive to radiation from said field of view for redirecting said radiation in accordance with an angular orientation of said redirecting means;

means for supporting said redirecting means to permit variation in the angular orientation of said redirecting means;

means for generating a square wave;

means for generating a scan signal in response to said square wave as an integration thereof having first and second alternating portions of oppositely and linearly varying characteristics;

means for sensing rotational rate and position of said redirecting means to provide a rotation representing signal;

means for combining said scan signal, said square wave signal, and said rotation representing signal to provide a highly damped drive signal; and means for applying torque to said redirecting means in response to said drive signal.

12. The system for linear, bidirectional scanning of radiation of claim 11 wherein said combining means includes:

means for producing an error signal as an amplified difference between said scan signal and said sensed position; and means for producing as said drive signal an amplified combination of said error signal with the difference between said square wave signal and said sensed rate.

13. The system for linear, bidirectional scanning of radiation of claim 11 wherein said integrating means includes means operative to respond directly at its output to a predetermined polarity transition in said square wave thereby to produce a sawtooth wave output.

14. The system for linear, bidirectional scanning of radiation of claim 9 wherein said generating means is adapted to provide one of said first and second portions with a substantially instantaneous variation as contrasted with the other portion.

* * * * *